(No Model.)
J. LANG.
PROCESS OF MAKING NITRIC ACID.
No. 477,375. Patented June 21, 1892.
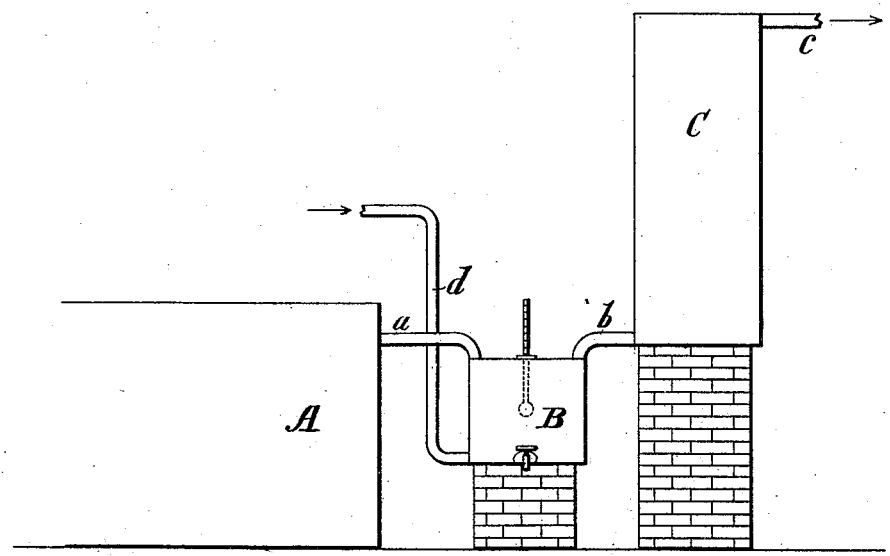
Witnesses:
R. D. Seward.
L. M. Egbert.
Inventor
Julius Lang
By attorneys
Brown & Seward

UNITED STATES PATENT OFFICE.

JULIUS LANG, OF GRIESHEIM, NEAR FRANKFORT-ON-THE-MAIN, ASSIGNOR TO CHEMISCHE FABRIK GRIESHEIM, OF FRANKFORT-ON-THE-MAIN, GERMANY.

PROCESS OF MAKING NITRIC ACID.

SPECIFICATION forming part of Letters Patent No. 477,375, dated June 21, 1892.

Application filed February 2, 1891. Serial No. 379,911. (No specimens.)

*To all whom it may concern:*

Be it known that I, JULIUS LANG, a subject of the Emperor of Germany, residing at Griesheim, near Frankfort-on-the-Main, Germany, have invented new and useful Improvements in the Manufacture of Nitric Acid, of which the following is a specification.

This invention has for its object the production of pure nitric acid direct from the generating-vessel.

Hitherto for production of pure nitric acid it has been common, first, to obtain crude acid by heating nitrate of soda with sulphuric acid and condensing the evolved vapor, and then to subject the acid to a further process for its purification. In consequence of the troublesome character of this process the necessary transport of the acid was always accompanied by losses and involved a large expenditure of time and labor. The heat of the vapor from the reaction-vessel, subject to the cooling-water, usually was allowed to go to waste, and afterward the crude acids were heated again, either directly or with the aid of steam in vessels of glass or stone ware or apparatus very sensitive to great changes of temperature, with or without admission of air. According to this invention nitric acid, free from hyponitric acid, nitrous acid, and halogen compounds, is obtained at one operation and without loss from commercial nitrate of soda and sulphuric acid, even though the nitrate of soda may contain iodine and a very considerable proportion of common salt.

The accompanying drawing represents an elevation of an apparatus by which my process is performed.

A is the generating apparatus, which may be of the kind commonly used in the manufacture of nitric acid, consisting simply of a retort placed over a fireplace. From this retort there is an outlet-pipe $a$, leading to the upper part of a collecting-vessel B, which is kept at a temperature at which all impurities are vaporized, but the pure nitric acid remains uncondensed. This temperature for obtaining concentrated nitric acid should be at least 80° centigrade, but for acids of less concentration may be lower. From the upper part of this collecting-vessel a pipe $b$ leads to a reflux-cooler C, which is kept at such temperature as to condense the pure nitric-acid vapors, but not low enough to condense the vapors of other products, as the lower nitric oxides and halogen compounds, which would contaminate the nitric acid. This temperature will be from 40° centigrade to 60° centigrade, according to the specific gravity of the nitric acid to be obtained—say about 40° for acid of a specific gravity of 1,384 and about 60° for acid of a specific gravity of 1,500.

In performing my process the sulphuric acid and the nitrate for the manufacture of the nitric acid are heated in the retort in the usual way.

In performing my process the ingredients for the manufacture of the acid are heated in the retort in the usual way, and the vapors generated in and passing over from the retort pass through the upper part of the heated collecting-vessel B, in which a considerable proportion of the pure nitric-acid vapors are condensed and collected, while the impure vapors pass, together with any nitric acid that may have been carried off with them, into the reflux-cooler C, in which the nitric acid so carried off is deposited by condensation, while the vaporized impurities pass off uncondensed by the pipe $c$ to be absorbed in water in a well-known manner. The production of pure acid, even at the temperature of 80° centigrade, is considerably simplified by conducting air or other gases into the acid in the collecting-vessel B, and for this purpose I have shown in the drawing an air-pipe $d$, entering the said vessel.

What I claim as my invention, and desire to secure by Letters Patent, is—

The method of obtaining pure nitric acid directly from the generator, consisting in first leading the mixed vapors of nitric acid, nitrous acid, and other impurities from the generator into a receiver and subjecting them therein to a heat which is not so high as to keep the pure nitric acid vaporized, but is high enough to keep the impurities vaporized, thence passing the vaporized impurities, together with any nitric acid that may have been carried off in a vaporized state, into a cooler, which is kept at a temperature low enough to condense the nitric-acid vapors and allowing the condensed acid to flow back into the said receiver, while the vaporized impurities pass off from the cooler uncondensed, substantially as set forth.

In testimony whereof I have signed my name to this specification in the presence of two subscribing witnesses.

JULIUS LANG.

Witnesses:
 FRANZ FLASSLACHER,
 FRIEDRICH SCHABLITZKI.